March 27, 1951     J. F. GRUBEN     2,546,540
DUAL FILM CAMERA
Filed March 30, 1948     2 Sheets-Sheet 1
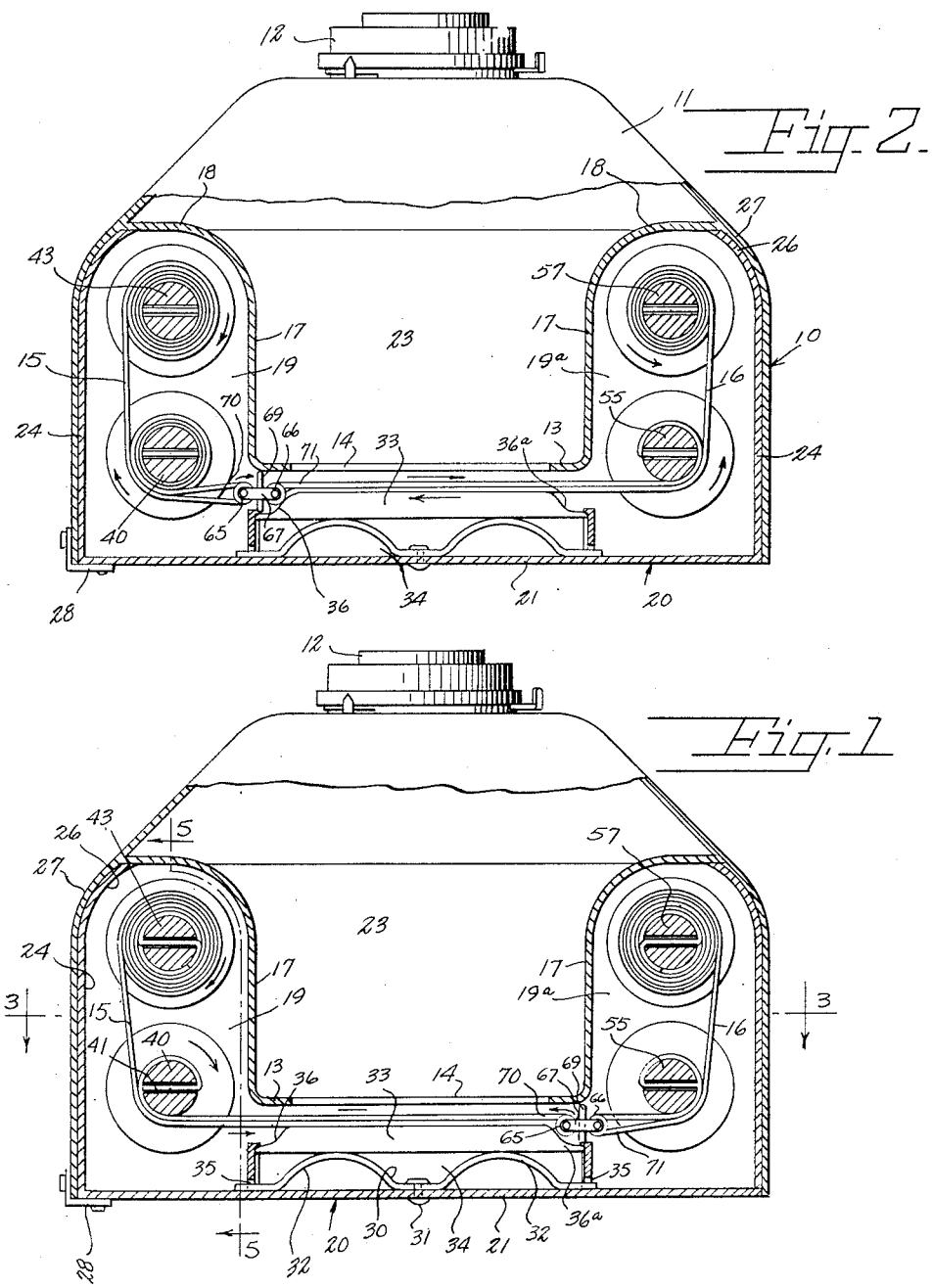
INVENTOR.
James F. Gruben,
BY
McMorrow, Berman & Davidson
Attorneys.

March 27, 1951     J. F. GRUBEN     2,546,540
DUAL FILM CAMERA
Filed March 30, 1948     2 Sheets-Sheet 2
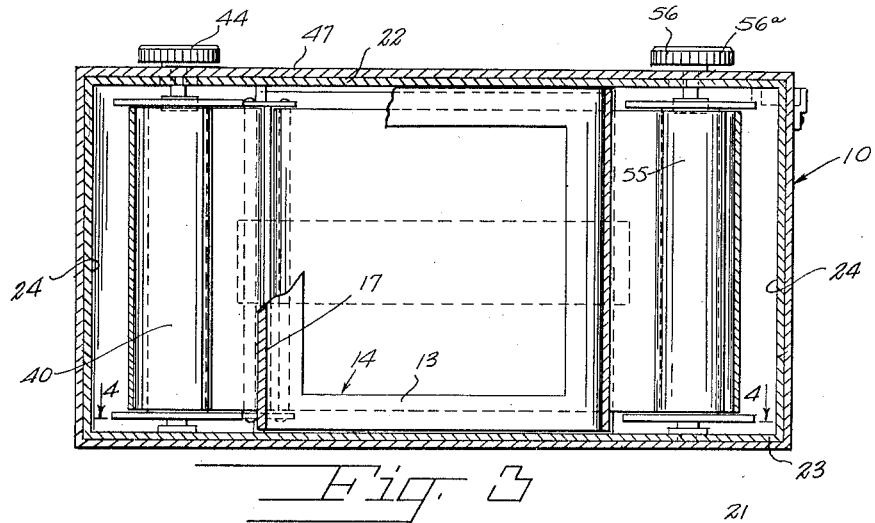
Fig. 3
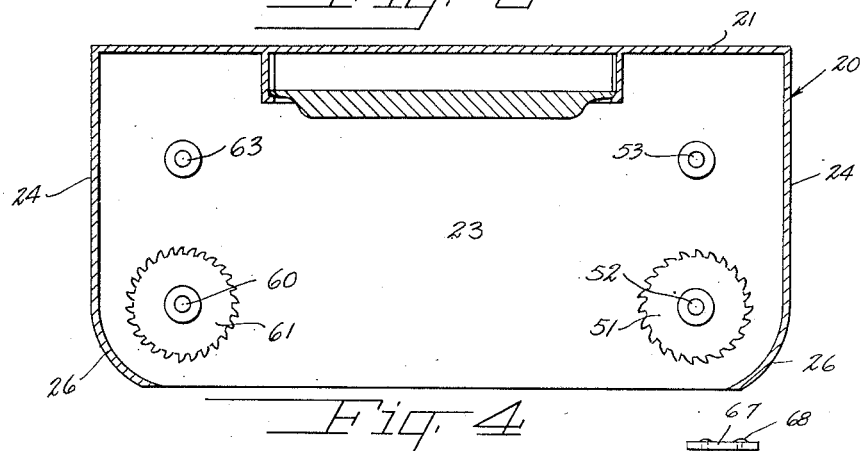
Fig. 4
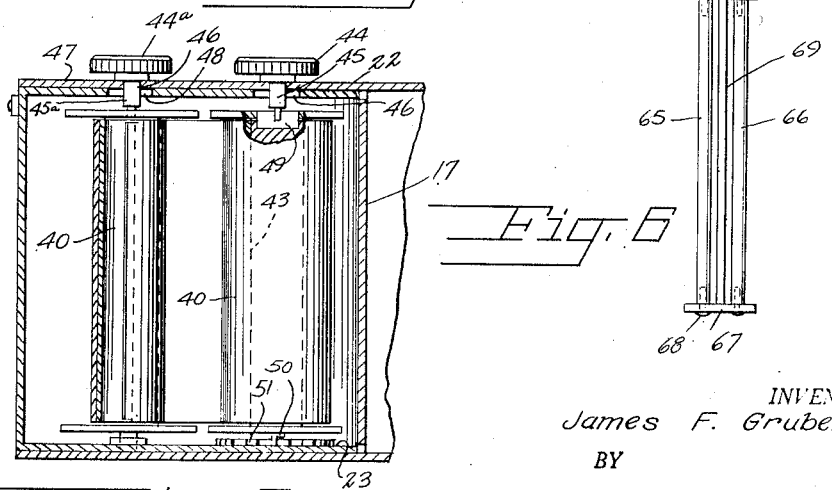
Fig. 5
Fig. 6
INVENTOR.
James F. Gruben,
BY
McMorrow, Berman & Davidson
Attorneys.

Patented Mar. 27, 1951

2,546,540

UNITED STATES PATENT OFFICE 2,546,540

DUAL FILM CAMERA

James F. Gruben, Roby, Tex.

Application March 30, 1948, Serial No. 17,990

2 Claims. (Cl. 95—31)

This invention relates to cameras having interchangeable films.

An object of the invention is the provision of a camera in which two rolls of films are so mounted in the camera that a frame of either film may be exposed successively, one film being employed for drawing an unexposed frame of the other film into an operative position in line with the usual lens, the film which is in an inoperative position being protected from light rays entering the camera.

A further object of the invention is the provision of a camera in which two rolls of films of different characteristics are so mounted in a camera that the films may be employed interchangeably, with a pair of spools for each film, one of the spools of a pair accommodating the unexposed portion of the film, the other spool carrying the exposed portion of said film, each film providing a loop to receive a connecting means therebetween so that when the first-mentioned spool of a pair is reversely rotated the associated loop will be fore-shortened for drawing an unexposed frame of the other film into an operative position while withdrawing the other film into a sealed chamber, means being employed for retaining the second spool of a pair against rotation when the other spool is rotated reversely, the inactive film being protected from light rays.

The invention consists in the novel construction, arrangement and combinations of parts more particularly described and claimed.

In the drawings:

Figure 1 is a horizontal section through the center of my camera showing a frame of one film in a position for exposure while the other film is housed and sealed against light rays, Figure 2 is the same horizontal section shown in Figure 1 but disclosing the positions of the films in a reverse order, Figure 3 is a transverse vertical section of the camera taken along the line 3—3 of Figure 1, Figure 4 is a transverse vertical section of the camera taken along the line 4—4 of Figure 3, Figure 5 is a fragmentary longitudinal vertical section taken along the line 5—5 of Figure 1, and Figure 6 is a plan view of a pair of rollers forming a connecting means between a pair of film and shown detached as a unit from the camera.

Referring more particularly to the drawings 10 designates a casing having a reduced forward end 11 in which is mounted the lens barrel provided with a shutter and operating means therefor. A partition having a flat rear wall 13 provided with an opening 14 for exposing the frames of the films 15 and 16 has forwardly extended side walls 17. The outer ends 18 of each side wall is curved laterally outwardly and secured to the adjacent side wall of the housing 10 to form film chambers 19 and 19a.

A removable closure 20 for the rear open end of the camera casing 10 includes a rear wall 21, a top wall 22, a bottom wall 23 and end walls 24. The inner ends 25 of the end walls are curved as shown at 26 to fit neatly curved outer portions 27 of the casing. The top, bottom and end walls of the closure fit snugly against the associated walls of the casing to prevent the passage of light to the interior of the camera. The inner end of the closure is open to permit light rays from the lens to pass directly to a film. A catch 28 maintains the closure in place.

A spring 30 is secured at 31 to the rear wall 21 of the closure 20. The spring includes a pair of oppositely disposed curved arms 32 pressing against a presser plate 33 which is guided in a frame 34 attached to the inner face of the wall 21. The free ends of the spring are movable in openings 35 in the sides of the frame and causes the plate 33 to exert a slight pressure on the film for retaining said film in the focal plane. The opposite side edges of the plate are cut-away or beveled at 36 and 36a for a purpose which will be explained presently. The inner face of the presser plate aligns with the opening 14 which is at the focal plane in the partition wall 13.

A supply spool 40 has the usual elongated slot to receive the inner end of the film 15 which has its unexposed portion trained on the spool 40 while the remaining or exposed portion is trained on take-up spool or roller 43. The end 41 of the film is secured in the usual slot in the spool 43. A manipulating knob 44 has a stem 45 received by a passage 46 in a top wall 47 of the casing 10 and by a larger passage 48 in the top wall 22 of the closure 20. The inner end 49 of the stem is flattened in the usual manner to receive a slot in the adjacent end of the spool 40. The take-up spool 43 is manipulated by a knob 44a and has a stem 45a and similar parts for rotating said spool. Both knobs and the similarly arranged parts may be drawn outwardly for releasing the closure 20 when the flattened portions 49 of the stems are received by the openings 47.

The other end of the spool 43 has a pawl 50

(Figure 5) which is adapted to move over the teeth of a ratchet wheel 51 fixed to the wall 23 of the closure when the spool is revolved in the direction indicated by the arrow in Figure 1. However, the teeth will prevent reverse rotation of the spool. The ratchet wheel has a bearing 52 (Figure 4) for the adjacent end of the spool 43. The other end of the spool 40 opposite from the knob 44a is received by a bearing 53 formed in the wall 23 of the closure 20. The spool 40 may revolve in either direction.

A supply spool or roller 55 containing the unexposed portion of the film 16 is mounted for rotation in opposite directions in the chamber 19a and is adapted to be revolved by a knob 56. A knob 56a is adapted to revolve a take-up spool or roller 57 carrying the exposed portion of the film 16. The upper ends of the spools 55 and 57 are engaged by flat portions on the inner ends of the stems attached to the respective knobs 56 and 56a in a manner identical with that just described in connection with the stems 45 and 45a on the respective knobs 44 and 44a.

The other end of spool 57 is mounted in a bearing 60 in a ratchet wheel 61 attached to the wall 23 of the closure 20. A pawl 62 secured to the last-mentioned end of the spool 57 engages the teeth of the ratchet wheel to permit rotation of said spool in the direction indicated by the arrow in Figure 2 but prevents reverse rotation of the spool. The outer or other end of the spool 55 revolves in a bearing 63 formed in the wall 23 of the closure 20. The spool 55 may be revolved in either direction.

A roller assembly shown in Figures 1, 2 and 6 plays an important part in changing from film 15 to the film 16 and vice versa. The assembly is virtually a floating roller assembly and includes a pair of parallel rollers 65 and 66 joined at the ends by parallel bars 67 the ends of the rollers are provided with pin 68 forming axles to permit rotation of the rollers. A baffle 69 is mounted at its ends on intermediate portions of the bars and disposed midway between the rollers 65 and 66.

A slip loop 70 of the film 15 receives the roller 65 and is formed by sections of the film from the spools 40 and 43. A slip loop 71 receives the roller 66 and is formed from sections of the film 16 from the spools 55 and 57.

Two types of films may be employed in the camera. The roll 15 may contain a color film while film 16 may be of the black and white type. Two rolls of the black and white type may be used having different speeds and revolving power. Whatever types of films are selected, one roll as 40 is placed in the chamber 19 and the free end thereof is looped around the roller 65 then carried around the roll 40 and inserted into the elongated slot in the spool 43. The film from the spool 55 is threaded around the roller 66 and carried downwardly and around the roll of film 16 on the spool 55. The free end of said film is secured in the elongated slot in the spool 57. The sensitive surface of the films must face the opening 14.

A frame of the film 15 is in an operative position for photographic purposes. Before the shutter in the camera has been actuated and it is desired to use the film 16 for the next picture. the spool 40 is revolved in the direction indicated by the arrow in Figure 1. Since spool 43 is held against reverse rotation the loop 70 will pull the roller assembly towards the chamber 19 until the assembly reaches the position shown in Figure 2.

The baffle will be seated snugly between the member 13 and the beveled upper edge 36 of the presser plate 33 thereby excluding light from the chamber 19 and the film therein. The spool 57 is retained against unwinding while the spool 55 releases the unexposed portion of the film 16 which is drawn upwardly before the focal plane opening 14. In each case of a change in the films, one of the spools 40 and 55 is revolved to roll the unexposed film thereon while drawing the unexposed portion of the other film into an operative position.

This type of camera may be used with a focal plane shutter or between the lens type shutter. This type of camera may incorporate the single lens reflex feature.

If the frame of the film 15 before the opening 13 has been exposed the knob 44 may be held stationary while the knob 44a may be turned in the proper direction as indicated by the arrow in Figure 1. The exposed portion of said film will be wound on the spool 43 while the roller assembly is drawn to the chamber 19 by the loop 70 as shown in Figure 2 with a frame of the film 16 being placed in position for the next exposure. The baffle 69 will act to close the chamber 19 or the chamber 19a to light rays to prevent the inoperative film from being exposed to light rays.

What I claim:

1. In a camera comprising a casing provided with two film chambers spaced apart, an objective on the casing, and a transverse wall between the chambers having an opening therein substantially in the focal plane of said objective, and there being a pressure plate spaced from the wall to provide passage between the wall and the plate for movement of films therebetween, the improvement which includes a film supply spool disposed in each chamber beyond the ends of said transverse wall, a take-up spool in each chamber disposed forwardly of the film supply spool therein and forwardly of the plane of said wall, means preventing reverse rotation and unwinding of each take-up spool, a baffle movable between said wall and said pressure plate transversely of the optical axis of said objective, a pair of bars forming roller supports spaced apart upon the baffle, two slip loop rollers rotatably mounted between the roller supports on opposite sides of said baffle and accompanying the latter in its movement between said wall and said pressure plate, the pressure plate having the edges thereon beveled from the forward surface thereof, a frame secured in said casing with forwardly directed edges thereon for removably retaining said pressure plate in predetermined position in which films from said supply spool are retained in a predetermined forwardly adjusted plane rearwardly of said transverse wall, two of said forwardly directed edges serving to limit movement of said baffle and forming limit stops therefor when the films on said supply spools are threaded over said slip loop rollers at each side of the baffle in such fashion as to form slip loops from which the films extend to the take-up rollers upon the same respective sides of the baffle on which they connect with supply rollers, and four manually operated knobs upon said casing with two knobs exteriorly of each chamber thereof and individually connected to the supply and take-up rollers in said chambers.

2. In a dual film camera, a casing having a pair of spaced-apart film chambers arranged upon opposite sides of a lens, each chamber containing a film-supply roll and a film-takeup roll, a transverse wall arranged within the casing and extending between the film chambers and having an opening in substantial alignment with the lens, a presser plate spaced from said wall and forming therewith a film passage having opposite ends leading into the film chambers and receiving film from each of said film-supply rolls, a connecting member arranged between the films adjacent the film passage and including a pair of spaced rollers about each of which a loop of one film formed between its supply and take-up rolls is adapted to be engaged, a baffle plate interposed between the spaced rollers of said connecting member for alternately closing the opposite ends of the film passage, and knob means carried by the casing and engaging the film supply and takeup rolls for taking up a selected one of said films and moving said connecting member and baffle plate from one end of the film passage to the opposite end thereof.

JAMES F. GRUBEN.

REFERENCES CITED

The following references are of record in the file of this patent:

UNITED STATES PATENTS

| Number | Name | Date |
|---|---|---|
| 2,245,606 | Rauch | June 17, 1941 |
| 2,420,628 | Stoiber | May 13, 1947 |